(No Model.)

J. E. FISHER.
SEAM RIPPING DEVICE.

No. 604,675. Patented May 24, 1898.

Witnesses
Chas. P. Heinemann.
James F. Duhamel.

Inventor,
John E. Fisher.
by John Wedderburn
Attorney

UNITED STATES PATENT OFFICE.

JOHN EDWARD FISHER, OF ELMSDALE, CANADA.

SEAM-RIPPING DEVICE.

SPECIFICATION forming part of Letters Patent No. 604,675, dated May 24, 1898.

Application filed June 10, 1897. Serial No. 640,225. (No model.)

*To all whom it may concern:*

Be it known that I, JOHN EDWARD FISHER, of Elmsdale, in the county of Hants, Nova Scotia, Canada, have invented certain new and useful Improvements in Seam-Ripping Devices; and I do hereby declare the following to be a full, clear, and exact description of the invention, such as will enable others skilled in the art to which it appertains to make and use the same.

The invention relates to a seam-ripper or seam-ripping device, the object being to provide a simple and effective device for facilitating the ripping of seams, an operation which, with the means ordinarily employed for the purpose, often requires the expenditure of much time and care to prevent injury to the material operated upon.

It consists in providing a suitable handle with a pair of yielding jaws adapted to grasp and follow the seam and a cutter or knife applied to one of said jaws and crossing obliquely the line of the opposing edge of the jaws for cutting the thread forming the seam; also, in certain novel details of construction of the device and the arrangement of its parts, as hereinafter described and claimed.

Figure 1:
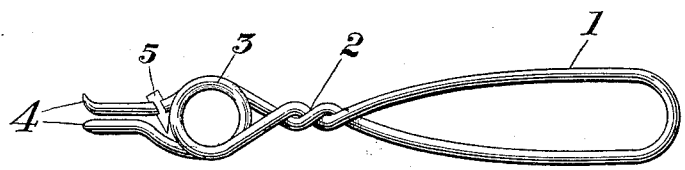
Figure 2:
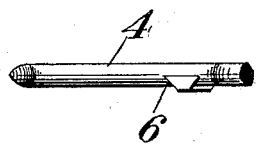
Figure 3:

In the accompanying drawings, Figure 1 represents a side elevation of the improved device or implement. Fig. 2 represents a plan view of the jaw which has the knife or cutter applied thereto. Fig. 3 represents a transverse section through the jaws, showing the formation of the same.

1 indicates a wire or small rod bent into loop form to constitute a handle united in front thereof by being twisted together, as shown at 2. In front of said twist uniting the wires of the handle the wires diverge and are bent and one or both formed into a coil, (indicated at 3,) from which point they again converge immediately in front of the coil or coils and are brought into the opposing knife-edged blades 4 4 of the triangular form indicated in Fig. 3, the jaws being sufficiently sharpened to follow readily the line of the seam, but not sufficiently so to cut or otherwise injure the fabric. These jaws are made flaring at their forward ends, the lower one being rounded on its upper face and slightly, also, on its lower face, and adapted to move readily over the table upon which the fabric rests. The upper one is bent slightly upward, thereby making the jaws open at the front and adapting them to readily receive the fabric to be operated upon. Immediately in rear of the jaws and of their point of contact is secured the obliquely-arranged blade or cutter 5, set in a dovetailed socket 6, formed in the jaw, the blade in transverse section conforming in shape to the said socket for its reception.

The operation of the device will be readily understood from the foregoing description. The fabric to be operated upon for ripping the seam is placed between the jaws 4 4, the latter grasping them in a line with the seam, and the handle serves to force the implement forward following the line of the seam. The thread forming such seam as it reaches the cutter 5 will be readily severed thereby, the latter being set obliquely and crossing the line of contact of the jaws and serving to act upon the threads with a drawing cut.

From the foregoing description it will be seen that the jaws, the spring-coils for controlling them, and the handle for operating the device are all formed from a single rod or wire, the only separate piece being the blade or cutter, which can be attached as needed for sharpening or other purposes. This is the preferred form of construction; but the jaws may be made separate from and rigidly secured to the wire-handle, if desired, without departing from the invention.

Having thus described my invention, what I claim as new, and desire to secure by Letters Patent, is—

1. As an improved article of manufacture, a seam-ripping device comprising a suitable handle, yielding jaws having flaring ends and opposing knife-edges for grasping and holding the seam, one of said jaws carrying a knife or cutter crossing obliquely the plane of the opposing jaw edges, substantially as and for the purpose specified.

2. In a seam-ripping device, the opposing knife-edged yielding or spring jaws having flaring or diverging receiving ends, separated at their rear ends, said jaws being formed integrally with the arms of wire twisted together in rear thereof, and extended in a loop forming the handle, with a blade or cutter applied to one of the jaws, substantially as described.

3. As an improved article of manufacture, a seam-ripping device comprising knife-edged jaws, a handle formed integral from a single rod or wire, a coil in said wire intermediate said jaws and handle forming an opening in the rear of said jaws, a spring for pressing the jaws together, and a knife or cutter connected to one of said jaws and operated substantially as described.

In testimony whereof I have signed this specification in the presence of two subscribing witnesses.

JOHN EDWARD FISHER.

Witnesses:
BLANCHE URQUHART,
A. G. FISHER.